United States Patent [19]

Nair et al.

[11] Patent Number: 5,362,952
[45] Date of Patent: Nov. 8, 1994

[54] CARD TRANSACTION TERMINAL

[75] Inventors: Parameswaran B. Nair, Acworth; Kumar S. Choudhuri, Kennesaw; James T. Stills; John C. Evans, both of Atlanta, all of Ga.

[73] Assignee: MicroBilt Corporation, Atlanta, Ga.

[21] Appl. No.: 141,918

[22] Filed: Oct. 22, 1993

Related U.S. Application Data

[62] Division of Ser. No. 790,658, Nov. 8, 1991.

[51] Int. Cl.⁵ ............................................. G06K 13/06
[52] U.S. Cl. ............................................. 235/449
[58] Field of Search ..................... 235/439, 449, 380

[56] References Cited

U.S. PATENT DOCUMENTS 4,788,420 11/1988 Chang et al. .................. 235/483
4,980,522 12/1990 Murakami .................... 200/302.2

*Primary Examiner*—John Shepperd
*Attorney, Agent, or Firm*—Jones & Askew

[57] ABSTRACT

A low cost, easily-manufacturable circuit for a data card transaction terminal for reading a magnetic stripe on a data card. The circuit comprises a single, double-sided circuit board having minimized circuit components. The printed circuit board mounts an alphanumeric liquid crystal display (LCD) to a first side of the circuit board, a single chip LCD driver circuit, a bracket for extending through mounting holes in the circuit board and holding the liquid crystal display, keypad electrical contacts formed on the first side of the circuit board, and a plurality of circuit components all affixed to the second side of the circuit board. The circuit components affixed to the second side of the circuit board include a nonvolatile electrically erasable programmable read-only memory (EEPROM), a single chip modem circuit, data access arrangement circuitry for connecting the modem to an external telephone line, a magnetic stripe read head interface circuit, and a single chip microcomputer circuit including with internal mask-programmed read-only memory for storage of a software program. The circuit components include no memory components other than the EEPROM and memory internal to the single chip microcomputer.

1 Claim, 9 Drawing Sheets

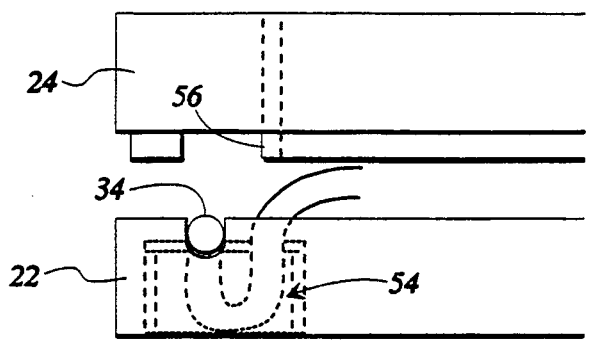
FIG 3A
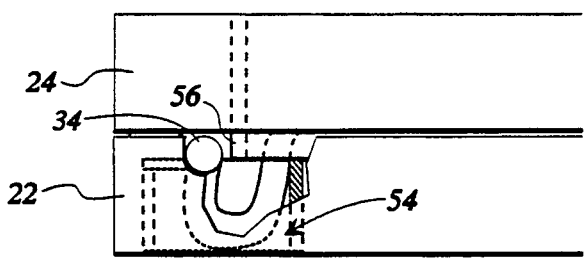
FIG 3B
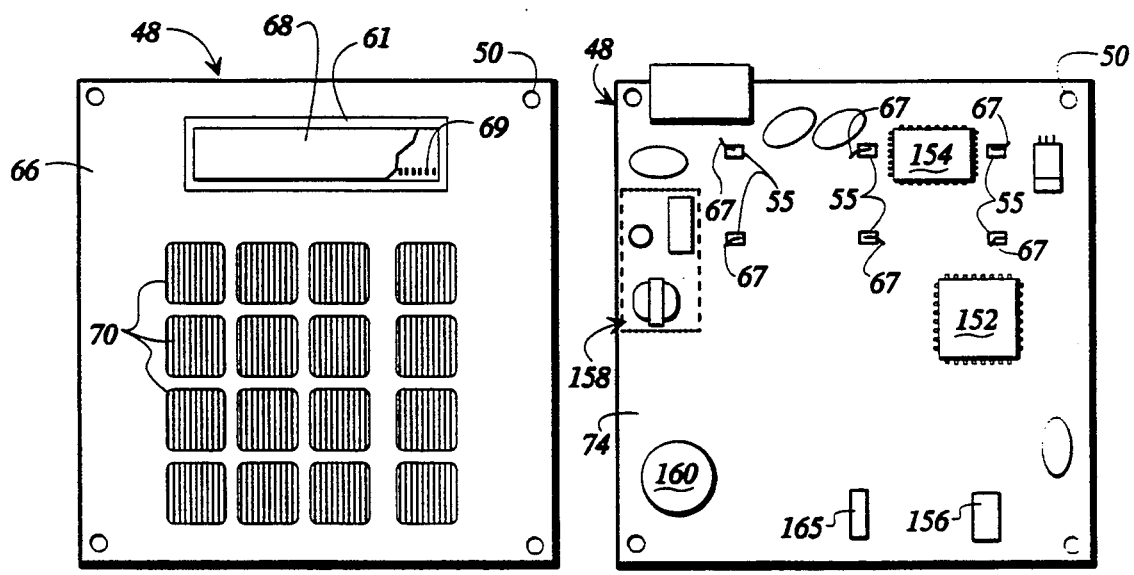
FIG 4A    FIG 4B

(DECODE VALUE SUBROUTINE)

CARD TRANSACTION TERMINAL

This is a division of application Ser. No. 07/790,658 filed Nov. 8, 1991.

TECHNICAL FIELD

The present invention relates generally to systems and methods for reading magnetic stripes on data, and more particularly relates to a low-cost terminal for reading and decoding data encoded on a magnetic stripe on a card and automatically implementing a transaction authorization processing algorithm.

BACKGROUND OF THE INVENTION

In recent years, it has become increasingly common for consumers to pay for goods and services they purchase with data cards such as credit cards instead of with cash or checks. Two elements must be present before a credit card transaction can occur successfully. First, the consumer must possess a valid credit card issued by a bank or other credit card issuing institution. Second, the merchant must be able to accept the card as payment for the goods or services and to receive payment from the issuing institution, which in turn receives payment from the consumer.

Credit cards are usually issued by banks and other financial institutions. When a card is issued, the issuer is, in effect, granting a line of credit to the cardholder. Because the issuer is granting a line of credit, a card will be issued only after the issuer has conducted a credit background check and is satisfied as to the consumer's ability and willingness to repay the debts incurred. The issuer's confidence is reflected in the amount of credit granted, which may range from a few hundred dollars to tens of thousands of dollars.

Although credit cards provide significant convenience for both cardholders and merchants, there are also well-known risks associated with credit card transactions. The principal risk is fraudulent or unauthorized use of the credit card. In such a case, the goods or services are taken by a cardholder and are usually unrecoverable. The loss must then be absorbed by the merchant and/or the credit card issuer.

Over the years, card issuers and merchants have relied on several different methods to verify the validity of a credit card, and to protect themselves from fraudulent and unauthorized credit card use. Initially, card issuers provided "warning bulletins" to merchants. Warning bulletins, which are still in widespread use, are booklets that list the account numbers of credit cards that should no longer be accepted. Account numbers are included on these lists if the card had been reported stolen, or if the cardholder has exceeded the credit limit or failed to pay the bill.

Subsequently, the issuers provided telephone numbers that merchants could call in order to receive telephonic authorization for a proposed transaction. Card issuers, or in some cases independent credit card transaction processors, maintain computer databases containing information concerning valid or invalid credit card account numbers, as well as credit limits, and provide telephonic authorization numbers or codes for transactions that were authorized. Telephonic authorization provided an improvement over the use of warning bulletins because the database against which the account number and purchase amount were verified could be updated more frequently than new warning bulletins could be mailed out.

As computer and modem technology became more advanced, the industry developed electronic authorization terminals that drastically reduced the time required to receive "electronic" authorization. With early electronic authorization terminals, a merchant had to enter the credit card number after establishing a connection with a card issuer's host computer. Many terminals in use today are "card swipe" terminals. In such card swipe terminals, a merchant swipes the credit card through a slot, and the terminal automatically reads and decodes the credit card number and expiration date from a magnetic stripe on the credit card. The terminal then prompts the merchant to enter the amount of the transaction. The terminal places a call to a credit card database host computer and transmits the information relating to the proposed transaction. The host computer compares this data with the credit card database and determines whether the proposed transaction should be authorized. If so, an authorization number is transmitted back to the terminal and displayed to the merchant, who records it on the sales draft.

As automated transaction processing methods have become more widely available, credit card issuers have developed a variety of incentives to encourage use of their particular card among merchants. For the most part, these incentives have been directed to decreasing the risk and expense associated with credit card transactions. For example, an issuer and/or credit card transaction processor may charge a lower fee to merchants who utilize electronic authorization.

Although authorization terminals decrease the risk and expense associated with each credit card transaction, some merchants perceive that use of electronic terminals increases the overall cost and complexity of the equipment they must use. This is especially relevant to merchants that process a medium to low volume of credit card transactions. In order to make the use of authorization terminals attractive to these merchants, it is essential that they be inexpensive and easy to operate.

In light of the benefits available to merchants who use credit card authorization terminals, it is believed that more merchants would use them if the cost were low enough and the terminals were easy to use. However, many merchants have already made a deliberate decision regarding which, if any, credit cards they will accept, and which company will do their credit card processing. Once a decision is made, the merchant may be reluctant to incur the additional expense and administrative requirements that would accompany a decision to accept other types of credit cards, or to change credit card processing companies. This reluctance makes it difficult for companies offering competing credit cards or processing services to expand and develop their markets.

As a result of intense competition, credit card issuers and transaction processors are constantly looking for new ways to expand and develop their customer base. One possible way to do this is to make it easier and/or less expensive for a merchant to accept their card or use their processing service. One method by which this may be accomplished is to provide a card transaction terminal that facilitates the acceptance of their credit card or access to their processing service at a lower cost than their competitors. Thus, a credit card issuer or transaction processor could provide an extremely low cost authorization terminal to a merchant at little or no cost in order to induce the merchant to accept their credit card or use their processing services.

The availability of a sufficiently low-cost and easy to use card transaction terminal would provide significant marketing advantages for credit card issuers trying to expand the market for their particular credit cards and/or credit card processing services to merchants.

The cost of credit card authorization terminals is determined by several major factors. One is the requirement of a certain minimum level of functionality, necessitating the inclusion of components such as a microprocessor, magnetic stripe reading assembly, communication means such as a modem, a keypad, and an information display. The cost of the parts themselves varies according to the number and type of component parts selected to implement the design. In addition, a large number of parts, or a complex design tends to increase the cost of manufacture and assembly, while fewer parts and a simpler design tend to reduce such costs.

One attempt to provide a low cost credit card authorization terminal is found in U.S. Pat. No. 4,788,420 to Chang et al. However, this terminal fails to meet the above-described need for a low cost terminal for several reasons. The terminal employs many components that unnecessarily increase its complexity and cost. The use of two interconnected printed circuit boards requires costly cabling and connectors in addition to the cost of fabricating two printed circuit boards. The terminal also employs a data read head assembly that is attached to a metal bracket and mounted to a top housing by two screws, requiring additional handling of several small parts. The Chang et al. terminal also relies on a battery to preserve information in a non-volatile memory, and employs a two-step data decode algorithm that requires extra random access memory in order to store and decode the data from the magnetic stripe. Both the cost of the parts themselves and the cost of assembling the terminal increase with each additional part that is used.

Certain aspects of other prior art authorization terminals also contribute to the complexity of operation. Before an authorization terminal may be used to process a credit card transaction, it must be properly configured or "initialized". The initialization process typically requires the merchant to enter a merchant identification number, merchant telephone number, and the telephone number of the host computer. The terminal then dials the host, provides the identifying information to the host, and downloads other information, such as the types of credit cards the terminal will recognize and secondary host telephone numbers. In order to accomplish these tasks, the merchant must spend time reading instructions or manuals related to the terminal.

In addition, the merchant must often determine how to use a transaction authorization terminal in conjunction with his existing telephone equipment, such as a merchant's private branch exchange (PBX). Some PBX equipment requires special codes or digits to be entered before dialing any telephone number (for example, a "9" must be dialed before other digits of the telephone number). Special configuration routines must be provided in the terminal's operation so that the special codes or digits can be made a part of the host telephone number. Provision of such additional steps adds to the complexity of use and discourages merchants from accepting new credit cards or authorization equipment.

Despite prior art attempts to provide an extremely low cost, full featured authorization terminal, the cost is still high enough that many low volume merchants prefer to manually place a call to a credit card transaction processor in order to receive authorization for credit card transactions. Therefore, there is still a significant need for an easy to use, extremely low cost credit card authorization terminal that provides all the necessary functionality.

SUMMARY OF THE INVENTION

The present invention overcomes the above-described problems in prior art credit card authorization terminals by providing an improved low cost, easily manufacturable, full-featured card transaction terminal. Where prior art designs rely on a variety of components that increase the cost and complexity of the terminal in order to maintain the required level of functionality, the present invention incorporates a novel approach by simplifying the design, and reducing the number of components required by the terminal while maintaining the necessary functionality. Terminals constructed in accordance with the present invention require fewer components and exhibit dramatically lower manufacturing and assembly costs, thereby offering affordability to low volume merchants and credit card issuers who wish to offer incentives by providing terminals to merchants at little or no cost.

Briefly described, the present invention provides a novel credit card transaction terminal including a plastic top and bottom case or housing, a keypad, an alphanumeric data display, a magnetic stripe reader, and a single double-sided printed circuit (PC) board for mounting all electronic circuit components, including the data display and a microprocessor. The single, double-sided PC board eliminates the need for costly circuit board-to-circuit board interconnects, and includes keypad electrical contacts. The magnetic stripe reader is constructed as a separate, "drop in" sub-assembly that facilitates final assembly. The plastic housing utilizes built-in mounting studs for quick positioning of the printed circuit board and snap fasteners for securing the top and bottom housings together in final assembly, without the need for screws or other fasteners.

The preferred terminal also incorporates software programs for the microprocessor that simplify the operation of the terminal and lower the cost of the terminal. A novel data decode algorithm is implemented to decode data in real time or "on the fly" as it is read from the magnetic stripe on the card, thus eliminating the need for additional random access memory, that is typically required in prior art terminals for storing and decoding data.

More particularly described, the present invention provides a low cost, easy to use, and easily manufacturable card transaction terminal that utilizes a single double-sided printed circuit board to accommodate all of the electronic circuit components. The top surface of the printed circuit board is available to accommodate an alphanumeric display and electrical keypad contacts that are formed directly on the surface of the circuit board. The other electronic circuit components, including a microprocessor, modem, telephone line interface, and nonvolatile memory, are mounted on the bottom surface of the circuit board.

The preferred keypad mechanism is formed from a single piece of silicone rubber or similar material. Each key on the keypad includes an electrically conductive carbon contact or pellet located on the bottom surface of the key. The carbon contacts or pellets come into electrical contact with the keypad contacts on the top surface of the circuit board when a key is depressed.

The preferred terminal incorporates non-volatile memory storage for critical information, preferably electrically erasable programmable read only memory (EEPROM), obviating batteries and battery backed up static random access memory (RAM) used in some prior art terminals.

The preferred case also includes molded self-aligning keypad guides that facilitate insertion of the keypad during assembly. The case also incorporates an integral strain relief mechanism for the power cord that eliminates the need for separate strain relief hardware. The case also includes integrally molded snap fasteners that hold the top half and bottom half securely together without the use of any screws or other fasteners.

Other aspects of the preferred case include an integrally molded strain relief well in one case half for receiving a predetermined length of electrical power cord or wire. A mating strain relief tab is provided on the opposite case half for securely holding the length of electrical cord in the well.

A plurality of printed circuit board mounting posts or studs are positioned in the case to extend through corresponding mounting holes in the printed circuit board and support the circuit board in a temporary inverted position during assembly of the terminal. The mounting posts or studs are used to precisely position the printed circuit board during assembly, and to securely hold the circuit board and keypad once the unit is assembled.

The preferred case further includes a plurality of cylindrical posts in one case half for matingly engaging with support studs of the opposite half and holding the printed circuit board firmly in position in operative juxtaposition with the conductive pellets of the keypad membrane when the top half and the bottom half are assembled together. Integrally molded snap fasteners are provided in the top half and bottom half for fastening the top half and bottom half together to complete the assembly of the terminal without use of separate fasteners such as screws and the like.

Another aspect of the present invention is an improved data decoding algorithm that does not require a large memory buffer for storing card swipe information for post-processing. In the present invention, the data recorded on the card's magnetic stripe is decoded in real time, and only the decoded characters or digits are stored. On the magnetic stripe of a typical credit card, the densest track (designated as track 1) has a maximum of 79 characters which easily fit into the preferred microcomputer's internal RAM. This is contrasted with prior art methods wherein all data on the card is read into an external memory buffer for processing after the swipe is finished. The data on the magnetic stripe is decoded as self-clocking synchronous data which, in the case of all zeroes, would require 2 bytes of timing information to be stored for each bit of information. Track 1 data includes 210 bits per inch on a magnetic stripe that is 3.25 inches long, and includes leading and trailing zeros that are used for synchronization. Prior art terminals that utilize post-processing must, therefore, reserve 1366 bytes for timing information, which requires a 2K external RAM.

Accordingly, it is an object of the present invention to provide an improved low cost and easy to use magnetic stripe card transaction terminal.

It is another object of the present invention to provide an improved card transaction terminal having features in the terminal case that facilitate manufacture and final assembly of the terminal.

It is another object of the present invention to provide an improved card transaction terminal having structure in the case of the terminal for mounting a printed circuit board without the use of screws or other fasteners.

It is another object of the present invention to provide an improved card transaction terminal having an injection molded plastic case having a top half and a bottom half, with one half including integrally molded printed circuit board support studs positioned to extend through mounting holes in a printed circuit board and temporarily support the board during final assembly, and the other half including integrally molded mating cylindrical posts for engaging with the support studs and holding the printed circuit board firmly in position when the two halves are assembled together.

It is another object of the present invention to provide an improved low cost card transaction terminal having a plastic case that utilizes a snap-fit two piece construction in order to eliminate the need for expensive screws and/or other separate fasteners.

It is another object of the present invention to provide an improved low cost card transaction terminal having a plastic case with an integral power cord strain relief that securely anchors the power cord without the need for additional hardware.

It is another object of the present invention to provide an improved low cost card transaction terminal case having self-aligning keypad guides to facilitate insertion of the keypad during assembly.

It is another object of the present invention to provide an improved low cost card transaction terminal that utilizes a single double-sided printed circuit board instead of multiple printed circuit boards, obviating circuit board-to-circuit board connectors and additional mounting hardware found in prior art terminals that utilize multiple circuit boards.

It is another object of the present invention to provide an improved low cost card transaction terminal having minimized usage of random access memory, by implementing a decode algorithm that completely decodes data in real time as it is read from the magnetic stripe, instead of storing self clocking signals from the magnetic stripe in memory and subsequently decoding the self clocking signals.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIGS. 3A and 3B are partial views of the integrally formed strain relief mechanism of the preferred card transaction terminal of FIG. 1.

FIGS. 4A and 4B illustrate the top and bottom surfaces of the single, double-sided printed circuit board employed in the preferred card transaction terminal of FIG. 1.

DETAILED DESCRIPTION OF THE PREFERRED EMBODIMENT

Figure 1:
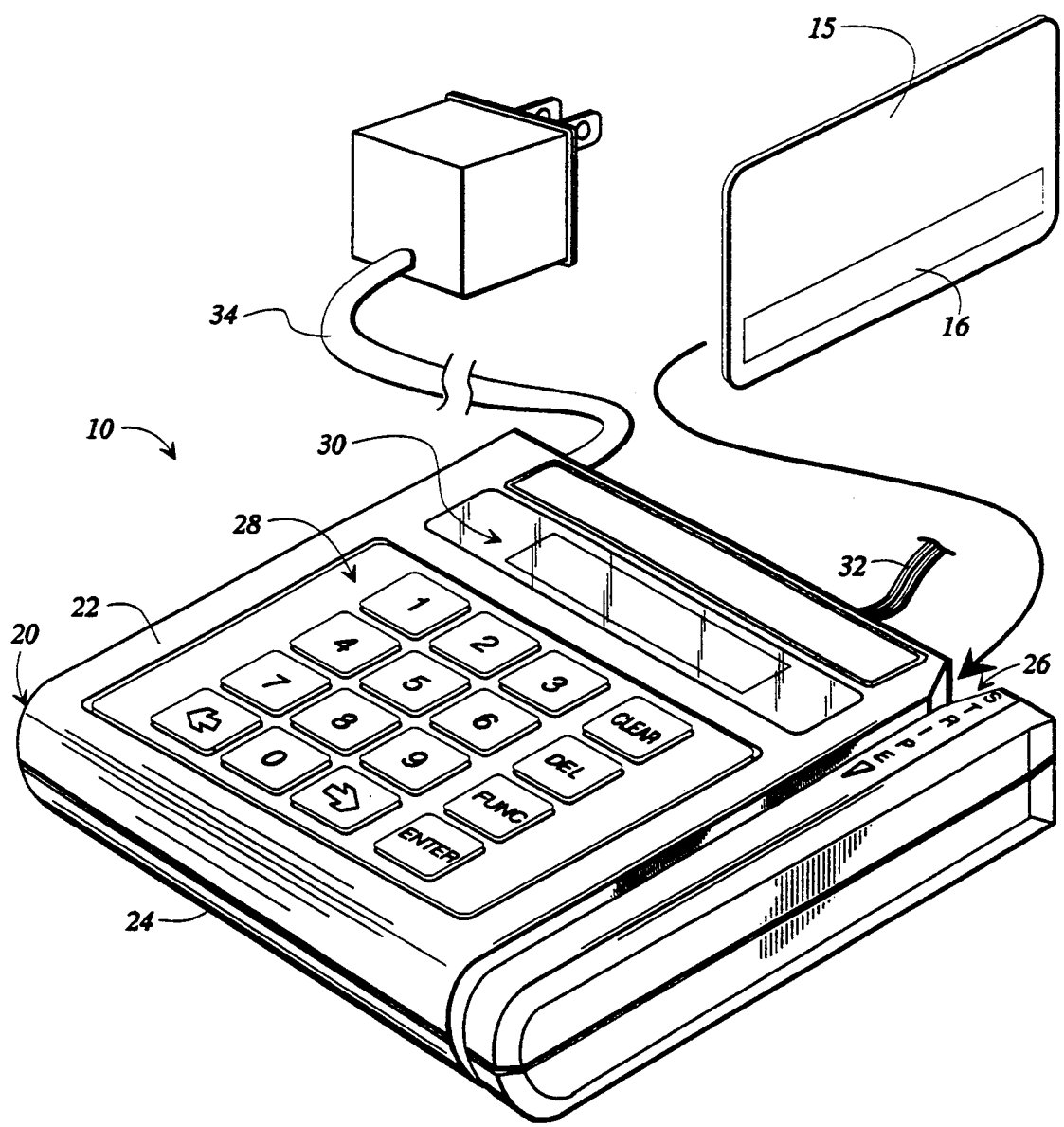
FIG. 1 is a perspective view of an improved low cost, easily manufacturable, and easy to use card transaction terminal constructed in accordance with the preferred embodiment of the present invention.

Referring now to the drawings, in which like numerals indicate like elements throughout the several figures, FIG. 1 illustrates the preferred embodiment of a card transaction terminal 10 constructed in accordance with the present invention. The terminal 10 includes an injection molded plastic housing or case 20 that includes a top half 22 and a bottom half 24. The top half 22 includes a card swipe slot 26. When a card 15, such as a credit card having a magnetic data stripe 16, is passed through the card swipe slot 26, the terminal 10 reads and decodes the data that is encoded on the card's magnetic stripe.

The terminal 10 also includes a keypad 28, which allows the user, such as a merchant, to enter various information concerning a transaction into the terminal. A liquid crystal display (LCD) 30 is provided in the top half 22, by which alphanumeric messages are displayed to the terminal user. The terminal 10 is connected to the telephone system by a standard telephone cord 32, and receives electrical power through a power cord 34.

Figure 2:
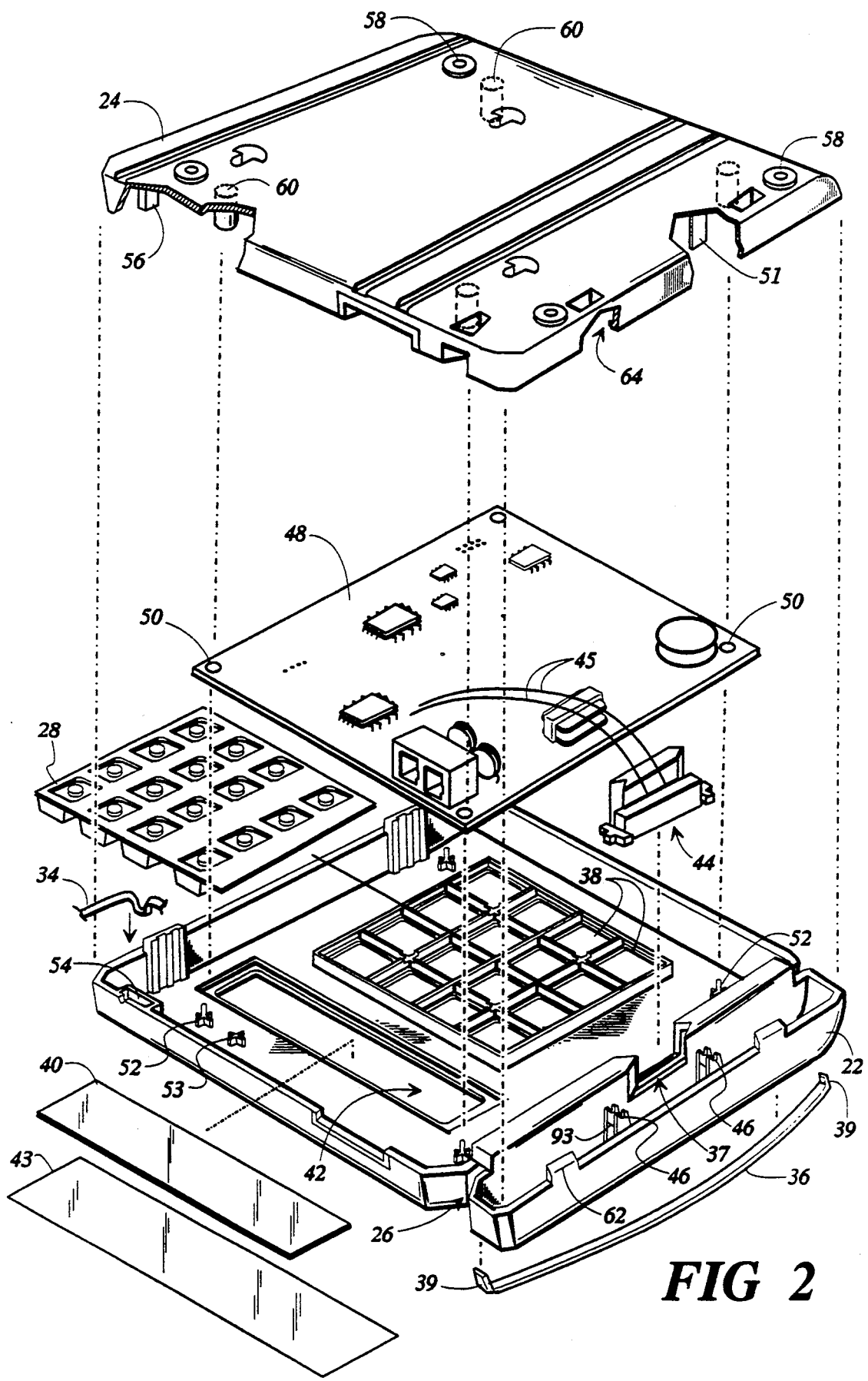
FIG. 2 is an exploded perspective view of the preferred card transaction terminal of FIG. 1, as viewed during final assembly.

FIGS. 2 and 3 illustrate generally the major components of the terminal 10 as viewed during final assembly. Each of these major components will be more fully described below.

The completed terminal 10 includes a top half 22, which is initially placed in an inverted position for receiving further components. An elongate pre-formed, metal anti-wear strip 36 is snapped into place in the bottom of the card swipe slot 26 in the top half 22 of the plastic case. The antiwear strip 36 preferably extends along substantially the entire length of the card swipe slot and is held in position by upturned ends 39 that form snap-fit fasteners. The upturned ends 39 snap into recesses in the ends of the card swipe slot and therefore eliminate the need for separate fasteners.

A clear or translucent plastic bezel 40 is installed in an opening 42 through which an alphanumeric display is viewed, and an anti-static lens 43 is placed on top of the bezel 40 in order to protect the electronic components inside the terminal from electrostatic discharge. A keypad 28 is positioned so that the keys of the keypad protrude through openings 38 in the top half 22. A data read head sub-assembly 44 is oriented and inserted into a gap 37 in the card swipe slot 26 and supported on support pylons 46. A printed circuit board 48, electrically connected to the data read head sub-assembly 44 via wires 45, is positioned to rest on mounting studs 52.

Once the printed circuit board 48 is installed, a portion of the power cord 34 is inserted into the integral strain relief well 54. The strain relief well 54 comprises a rectangular box molded in portion of the top half 22 and sized to receive a predetermined short length of power cord and immobilize same for strain relief. A mating tab 56 integrally molded in the bottom half 24 engages with the cord in the strain relief well 54 and securely holds the cord for strain relief when the top and bottom halves are snapped together.

FIGS. 3A and 3B more clearly illustrate the strain relief well 54 and strain relief tab 56 formed in the top half 22 and bottom half 24, respectively. During assembly, a predetermined length of the power cord 34 is inserted into the strain relief well 54. As shown in the partially cut away view of FIG. 3B, when the top half 22 and the bottom half 24 are assembled together, the strain relief tab 56 engages the cord 34 and provides strain relief, so that tension exerted on the cord from a force exterior to the terminal 10 is not transferred to the soldered electrical connection (not shown) between the power cord 34 and the printed circuit board 48.

Referring again to FIG. 2, the final stages of assembly will be described. Before the bottom half 24 of the case is attached to the top half 22, four rubber feet 58 are inserted into corresponding holes in the bottom half 24. The bottom half 24 is then aligned with the top half 22 so that cylindrical posts 60 and read head retaining stanchions 51 on the bottom half 24 are aligned with the mounting studs 52 and the pylons 46 that support the read head sub-assembly, respectively, on the top half 22. Once the bottom half 24 is properly aligned, the bottom half 24 is pressed down on to the top haft 22. The case 20 is complete when the snap tabs 62 on the top half engage the snap recesses 64 on the bottom half 24.

It will therefore be appreciated that the final manual assembly of the preferred terminal 10 is quick and efficient, inasmuch as there are few basic components and all components are configured for ease of assembly.

Referring now to FIGS. 4A and 4B, the details of the preferred single double-sided printed circuit board 48 will be described. The preferred printed circuit board 48 includes the mounting holes 50 positioned generally at the corners of the board, as well as LCD mounting holes 55. The top side 66 of the printed circuit board 48 includes two components. A liquid crystal display (LCD) 68 for display of alphanumeric information is mounted to the top side 66 of the printed circuit board 48. The LCD is visible through the bezel 40 in the top half 22 after assembly.

Those skilled in the art will recognize that most prior art terminals incorporate a pre-assembled LCD assembly that includes the display and display drivers, and require cables and connectors to electrically connect the LCD assembly to the printed circuit board. The present invention eliminates the extra cost associated with such an approach by fastening the LCD device directly on the single, double-sided printed circuit board.

Accordingly, the LCD display 68 is mounted to the printed circuit board 48 by a display mounting bracket 61. The mounting bracket 61 exerts pressure on the display 68 so that electrical contacts on the back of the display make contact with display contacts 69 that are formed on the top surface of the printed circuit board 48. The bracket 61 further includes twistable tabs 67 that protrude through the LCD mounting holes 55 and are twisted to extend over portions of the circuit board 48, and then soldered, to securely hold the bracket 61 on the board and maintain appropriate pressure against the LCD 68.

The printed circuit board 48 further includes screened carbon keypad electrical contacts 70 formed on the top side 66, beside the LCD 68, but positioned to engage with the conductive pellets on the keypad after assembly.

All of the other electronic circuit components, including a microcomputer 152, non-volatile memory 165, modem circuit 156, LCD display driver 154, and piezoelectric buzzer 160, are mounted on the bottom side 74 of the printed circuit board 48. Those skilled in the art will understand that the preferred single double-sided printed circuit board is laid out to incorporate most of the active electronic components on one side, and the keypad contacts and LCD mounting contacts on the other side, and provide appropriate electrical connections between such components in a multi-layer configuration. However, it will be understood that a two-layer configuration (top and bottom) is also possible, provided that the electrical connections and leads between components on the printed circuit board are arranged to provide for such appropriate electrical connections. It will of course be understood that the use of a single, double-sided circuit board obviates electrical connections and/or wires between separate printed circuit boards, thereby lowering the overall cost of providing the requisite electronic circuits for the preferred terminal 10.

Figure 5A:
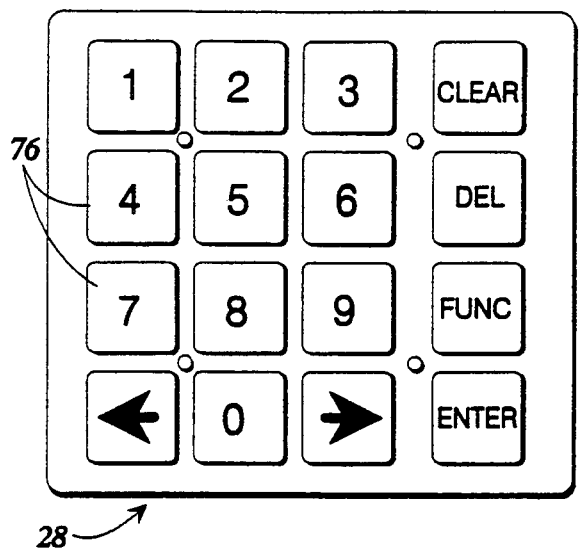
FIGS. 5A, 5B, 5C and 5D illustrate the keypad employed in the preferred card transaction terminal of FIG. 1.
Figure 5B:
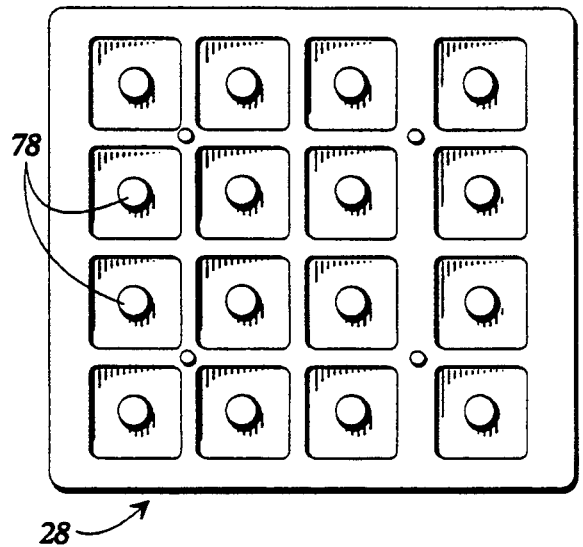
Figure 5C:
Figure 5D:

FIGS. 5A-5D illustrate the preferred silicone keypad membrane 28. The top side of the keypad 28 comprises a plurality of individually depressible keys 76. As shown in FIG. 5A, the keys are embossed or otherwise marked with appropriate identifying indicia such as numeral and function identifiers. As seen in FIG. 5B, a carbon conductive pellet 78 is located on the bottom surface of each of the keys 76. FIG. 5C illustrates an end view of the preferred keypad membrane 28. As seen in FIG. 5D, when one of the keys 76 is actuated, the corresponding conductive pellet 78 makes contact with the screened carbon keypad electrical contacts 70 located on the top side of the printed circuit board 48.

In the preferred embodiment, the keypad membrane 28 comprises silicone rubber with conductive carbon pellets 78.

Figure 6:
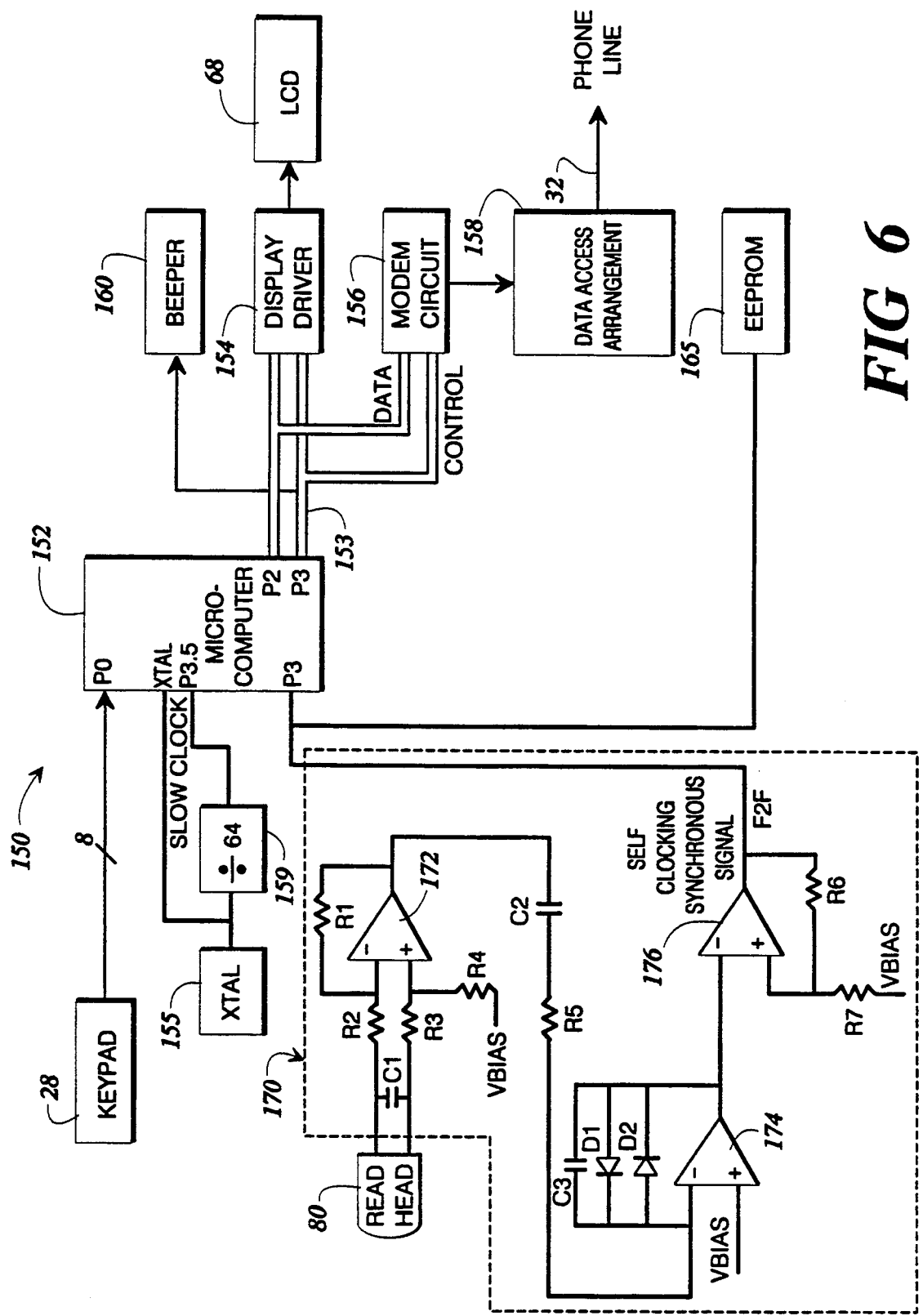
FIG. 6 is a block schematic diagram of the circuitry of the preferred card transaction terminal of FIG. 1.

Turning next to FIG. 6, next will be described the preferred circuitry 150 employed in a card transaction terminal 10 constructed in accordance with the present invention. This circuitry 150 is physically affixed to the single double-sided printed circuit board 48. The circuitry 150 includes a microcomputer 152, which serves as the central controller for the terminal. The microcomputer 152 includes an on-board mask programmed read-only memory (ROM) that stores the software programs that execute on the microcomputer 50.

As will be discussed below for certain selected methods forming a part of the present invention, the software programs stored in the on-board ROM are operative to cause the microcomputer 152 to execute an initialization or configuration routine, be responsive to actuations of the keypad 28, interpret and decode signals from a swipe of a magnetic stripe card, generate displays of alphanumeric information on the liquid crystal display 68, and control communications over the telephone line 32.

Inasmuch as many of the foregoing functions are common to the operation of card transaction terminals constructed as in the prior art, no further discussion of the basic operations of the terminal will be provided. However, to the extent required for a complete understanding of the present invention, after a general description of the circuitry, there will be a discussion of the operation of the method carried out in the present invention for adaptively detecting characteristics of a telephone system to which the terminal 10 is connected, in an initialization or configuration routine, and thereafter conducting further communications with a host system utilizing the information concerning the telephone system derived during the initialization routine.

The preferred microcomputer 152 is a type 80C51 eight-bit microcomputer manufactured by Intel Corporation, Santa Clara, Calif. Details of the preferred microcomputer are available in the literature supplied by the manufacturer. As will be understood by those skilled in the art, the 80C51 microcomputer type includes four eight-bit input/output ports P0, P1, P2 and P3, which are programmable ports that may be selectively configured for input or output, as determined by the controlling software program.

Output port P0, comprising eight signal lines, is connected to pads on the circuit board that are bridged by the conductive pellets of the keypad membrane 28 when a key is depressed. These connections are in a matrix-type arrangement (not shown), with four row signals and four column signals. Inasmuch as the keypad 28 includes sixteen keys in a four-by-four arrangement, it will be understood that eight signal lines are sufficient for enabling the microcomputer 152 to determine which of the sixteen keys has been depressed by the user.

The input/output port P1 of the microcomputer 152 receives various status signals and provides various control output signals on control lines 153. Some of these signals are provided to a display driver 154 that controls the display of alphanumeric information on the liquid crystal display 68. The preferred display driver 154 is a type 44780, manufactured by Hitachi America of Brisbane, Calif. Details of the preferred display driver 154 are available in the literature supplied by the manufacturer. Port P2 serves as an eight bit data bus in the circuit.

The port P1 of the microcomputer 152 also controls operation of a modem circuit 156. The modem circuit 156 controls communications with the host computer system via a telephone line, as will be understood by those skilled in the art. The preferred modem circuit 156 includes a type 5089 dual tone multiple frequency (DTMF) or TOUCHTONE ® signal generator, manufactured by Texas Instruments of Dallas, Tex., which is operative to receive eight data lines connected to port P2 of the microcomputer 152. The modem circuit 156 also includes a type 74HC943 integrated 300 baud single chip modem circuit, manufactured by National Semiconductor of Santa Clara, Calif. Those skilled in the art will understand that the microcomputer 152 is operative to provide write a data word to, or read a data word from, the data lines connected to port P2 for conducting communications with a host computer system.

The data lines of port P2 of the microcomputer 152 are also connected to the input data lines of the display driver 154, to enable data for display on the LCD 68 to be loaded into the display driver circuit 154, under control of the microcomputer 152.

The modem circuit 156 is connected to a data access arrangement circuit 158, which includes appropriate telephone company subscriber line interface circuitry such as a hook switch relay, isolation transformer, protection fuses, and other telephone interface circuitry known to those skilled in the art required for data communications via a conventional telephone line 32. Inasmuch as details of data access arrangement circuitry will be known to those skilled in the art, further discussion of same will not be provided herein.

The preferred liquid crystal display (LCD) 68 is preferably a type LBA331R-30 single line, sixteen character, alphanumeric, supertwist liquid crystal display manufactured by Phillips, Eindhoven, The Netherlands. Details of the preferred LCD 68 are available in the literature supplied by the manufacturer.

One of the control lines from port P1 is used to control a beeper or audible alarm circuit 160, which preferably is a type PKM17EPP-4001S piezoelectric transducer, manufactured by Murata-Erie North America of Smyrna, Ga. This beeper is used to generate audible alarm sounds or signals in response to a signal from the microcomputer 152.

It will be recalled from the discussion above that the present invention is operative to store certain parameters of operation in a non-volatile memory so that the information may be preserved during power-off conditions. The preferred embodiment employs a nonvolatile electrically erasable programmable read only memory (EEPROM) 165. For this purpose, the preferred EEPROM 165 is a type 93C46J manufactured by Microchip Technology of Chandler, Ariz. Control and data lines for the EEPROM 165 are connected to various lines of the ports P1 and P3 (not separately shown) of the microcomputer 152, and allow data to be serially clocked into the EEPROM for storage, and serially clocked out of the EEPROM during situations wherein the information stored therein is required for operation of the program of microcomputer 152.

Clock signals for the microcomputer 152 are provided from a clock crystal 155 to XTAL inputs of the preferred 80C51 microcomputer in the known manner. The preferred embodiment utilizes a 14.318 MHz crystal, which is divided internally to the microcomputer to form an internal clock signal of about 1 MHz. The 14.318 MHz signal from the crystal 155 is also provided to a divider circuit 159 that divides the signal into an SLOW CLOCK signal at about 220 kHz. This SLOW CLOCK signal is provided to the timer/counter 1 external input (P3.5) in port 3 of the microcomputer 152, and is used in the manner described below in connection with FIG. 22 for enabling the preferred embodiment to adapt to slow or fast swipes of the card.

Also shown in FIG. 6 is a card swipe interface circuit 170, which is connected to the read head 80. The card swipe interface circuit 170 is operative to condition signals generated by movement of a magnetic card stripe past the read head 80 during a card swipe, and provide these signals to the microcomputer 152 as a SELF CLOCKING SYNCHRONOUS or "F2F" signal. The SELF CLOCKING SYNCHRONOUS signal is connected to one of the input lines of port P3 connected to the microcomputer 152.

The preferred card swipe interface circuit 170 includes a first amplifier 172 having its inverting and non-inverting inputs connected through input resistors R2, R3, respectively, connected to the two terminals of the read head 80. A feedback resistor R1 connected between the output of the amplifier 172 and the inverting input determines the amount of gain, together with other components, in the manner which will be understood by those skilled in the art. A bias voltage VBIAS is connected through resistor R4 to the non-inverting terminal, to bias the output voltage level of the amplifier 172.

The output of the first amplifier 172 is connected to a differentiating amplifier 174, which is operative to detect peaks in the signal received from the amplifier 172. The differentiating amplifier 174 includes a pair of diodes D1, D2 connected in opposite bias directions between the output and inverting input. The diodes, in conjunction with a capacitor C3, operate in the known manner to conduct sharply when the voltage across the output and non-inverting input of the amplifier 174 rises to a predetermined level.

The output of the differentiating amplifier 174 is then connected to a zero crossing detector 176 that provides TTL level buffering for the signal and generates the F2F signal at its output. Resistors R6 and R7 are connected between the output and non-inverting input of the zero crossing detector 176 in order to provide hysteresis as the voltage level changes at the input of the zero crossing detector 176.

It will be appreciated from the foregoing discussion that the preferred microcomputer 152 includes a certain amount of random access memory (RAM), primarily in the form of storage registers, in addition to the on-board program ROM. However, those skilled in the art will appreciate from a review of FIG. 6 that there is no provision for any external RAM. It will be understood at this juncture that certain prior art terminal designs utilize separate RAM in the circuitry for storing all signals generated from a circuit similar to the card swipe interface circuit 170. This extra data storage is required since the signals generated by a swipe are not decoded in real time, but are decoded later when the data from the swipe are read out of RAM. It is known that prior designs have incorporated as much as 2 kilobytes of RAM for this purpose, necessitating the inclusion of separate memory chips for this purpose, and thereby adding to the cost of the terminal. For example, the Chang et al. U.S. Pat. No. 4,788,420 utilizes a separate CMOS RAM circuit with battery backup circuits, requiring additional components that must be handled and affixed to the circuit board, raising the overall cost and complexity.

It will be understood and appreciated that, in the present invention, the F2F or SELF CLOCKING SYNCHRONOUS signals generated from a swipe of a card are provided in real time to the microcomputer 152, and that the microcomputer is programmed to be responsive to such signals as they occur to decode the signals and determine the corresponding digit represented by such signal. Such an approach requires less than 128 bytes of data storage, which is available in the preferred 80C51 type microcomputer, thereby eliminating separate RAM circuit components and lowering the cost of the terminal.

While, of course, various error checking routines are also incorporated in the program for computer 152, in the manner determined by the particular longitudinal redundancy check (LRC) or other error checking provisions established by the card issuers, it will be appreciated that such error checking routines are also carried out in real time by the microcomputer 152 and that there is no interim storage of the SELF CLOCKING SYNCHRONOUS signals generated by a card swipe for later decoding, as is the case in many prior art terminals.

Figure 7:
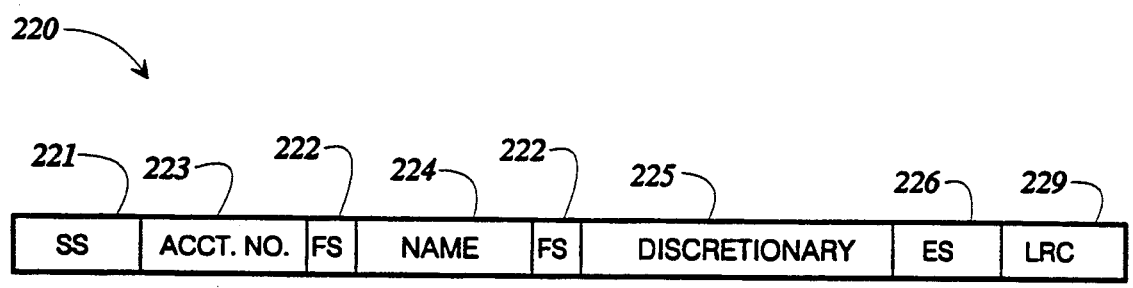
FIG. 7 is a diagram illustrating the data encoded on track 1 of a magnetic stripe of a magnetic stripe card.

Turning next to FIG. 7, and to provide a background for discussing a method carried out in the preferred embodiment by microcomputer 152 for decoding data from a card swipe in real or "on the fly", there will be described the scheme for standard magnetic stripe encoding for a track, such as "track 1" 220, of a typical magnetic stripe data card. This standard will be found in ANSI Standard X4.16-1983, published by the American National Standards Institute, New York, N.Y., which is incorporated herein by reference. In this standard, data characters are encoded as six bit values, with one parity bit, for a total of seven bits per character.

While the preferred embodiment only reads information from track 1, it should be understood that the method to be described is not limited to track 1 and is equally suitable for reading data contained on any other track of a magnetic stripe card.

The major components or fields of the track 1 data include the account number 223, cardholder name 224, discretionary data 225, and a longitudinal redundancy check (LRC) 229. Each of the fields is separated by a field separator 222. In addition, the account number field 222 is preceded by a start sentinel 221, and the longitudinal redundancy check field 229 is preceded by an end sentinel 226.

Figure 8A:
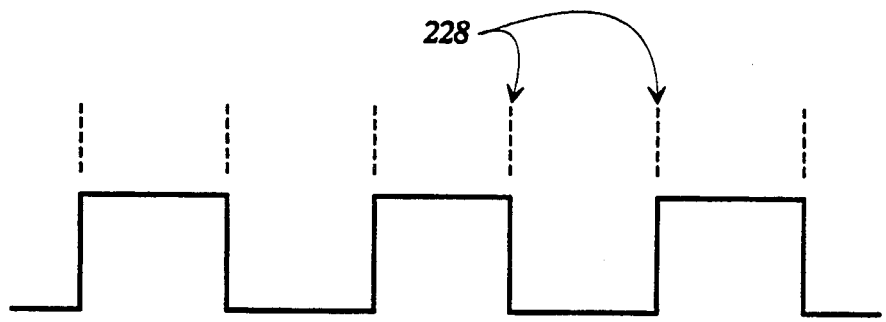
FIGS. 8A, 8B and 8C illustrate "F2F" or two frequency coherent phase encoded data commonly employed magnetic stripe credit cards.
Figure 8B:
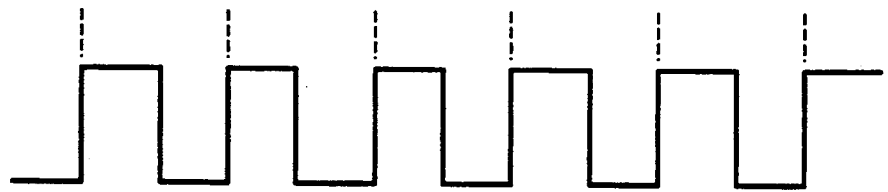
Figure 8C:
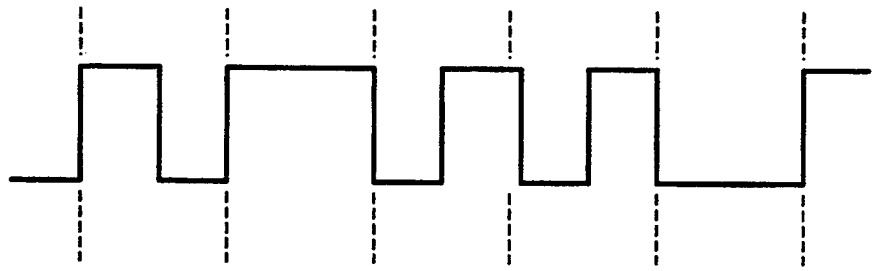

These "sentinels" 221, 226 will be understood to comprise predetermined patterns of signals stored on the magnetic stripe indicative of separation between data fields. For example, the ANSI standard start sentinel is a "%" character encoded as 000101, and the standard end sentinel is a "?" character encoded as 011111. There are also a number of leading and trailing zeros that precede the start sentinel 221 and follow the end sentinel 226, respectively, in order to provide synchronization FIGS. 8A–8C illustrate F2F encoded data, which constitute self clocking two frequency coherent phase encoding. The preferred terminal 10 is designed to decode F2F encoded data as specified in ANSI Standard X4.16-1983. This data encoding technique allows self-clocking synchronous data to be recorded on a single channel.

The recorded data includes data bits and clocking bits encoded together. A logic "1" is defined as a bit with a transition in the center of the bit cell. A bit cell representing a logic "0" contains no intermediate transition. Those skilled in the art will understand that it is the presence or absence of the transition in the center of the bit cell that determines whether the bit is a "1" or a "0". The voltage level of the signal itself at any given time is not determinative. As seen in FIG. 18, it will thus be appreciated that a typical "1" exhibits a total of three excursions or transitions of the SELF CLOCKING SYNCHRONOUS signal in FIG. 6, while a typical "0" exhibits but two excursions or transitions within the bit cell. It will also be understood that the final or closing transition of a given bit cell constitutes the beginning transition of the next bit cell.

In FIGS. 8A, 8B and 8C, the bit cell or data cell boundaries 228 are represented by dotted vertical lines. FIG. 8A illustrates a series of logical zeroes, while FIG. 8B illustrates a series of logical ones. FIG. 8C illustrates a series of bits containing both logical ones and logical zeroes.

In prior art methods of decoding data on a card, the decoding process is broken into two steps. In the first step, timing information regarding the transitions detected in the magnetic field is stored in a memory associated with the terminal, as the data is received. In the second phase, a microcomputer examines the timing data and "decodes" the data, i.e., recreates a bit pattern corresponding to data originally stored on the card indicative of the information represented by the signals, such as account number. As has been discussed, such prior art decoding methods require sufficient RAM for storing data associated with these magnetic field transitions, since the decoding of such data is done later.

Figure 9:
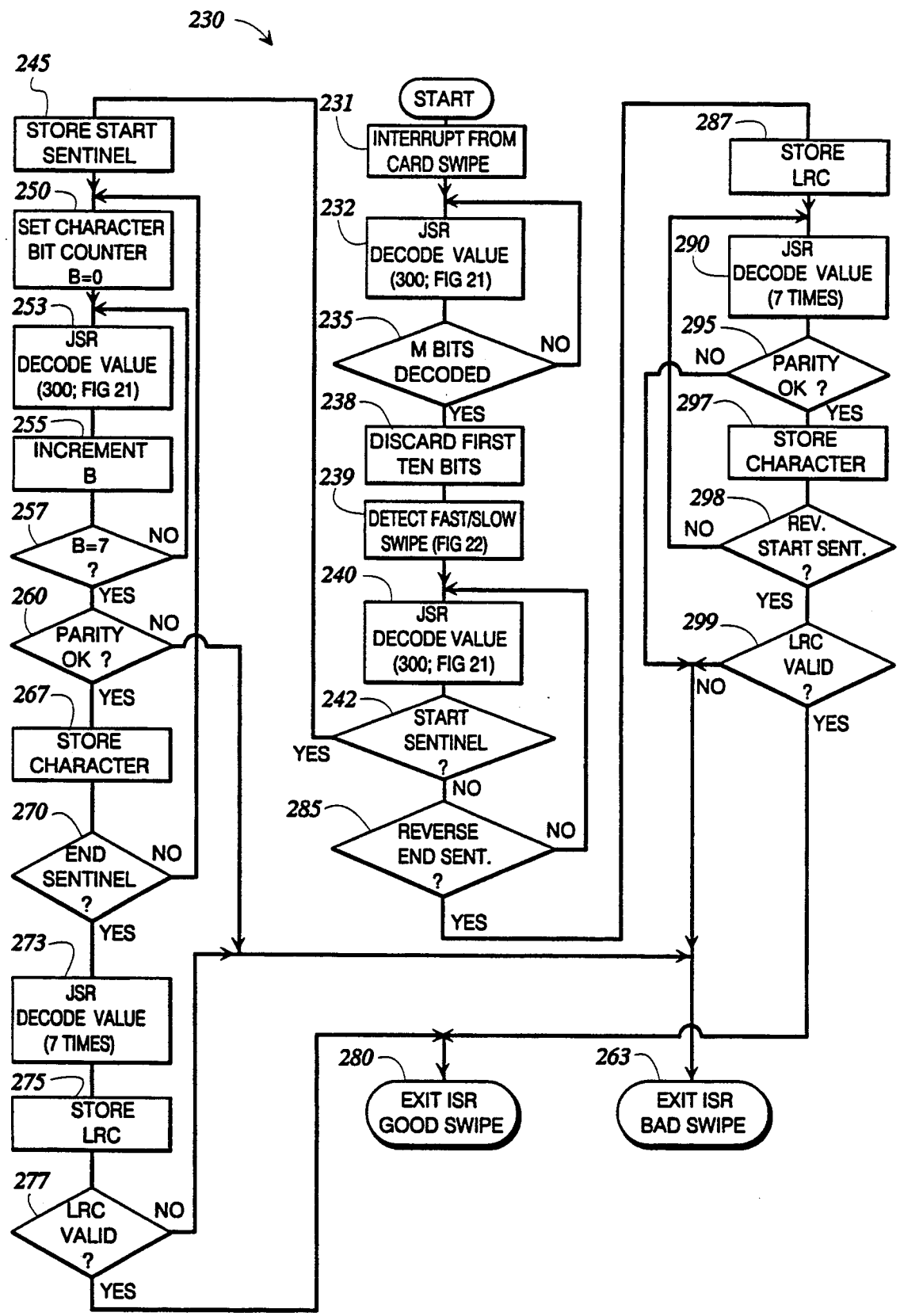
FIG. 9 is a flow diagram illustrating the real time data decoding method employed in the preferred embodiment.

FIG. 9 illustrates a real time data decoding method 230 carried out in the preferred embodiment, which eliminates the need for additional memory required to store timing data. As before, this method is carried out in the program for microcomputer 152. The real time decoding method 230 begins at step 231 when the microcomputer 152 detects a transition in the F2F or SELF CLOCKING SYNCHRONOUS signals from the read head 80 and card swipe interface circuit 170, and enters an interrupt service routine. These transitions in the F2F signal occur as a card is swiped through the terminal.

At step 232, the microcomputer enters the interrupt service routine and jumps to a subroutine (JSR) 300 denominated DECODE VALUE that is operative to determine whether a bit value represented by the SELF CLOCKING SYNCHRONOUS signal is a one or a zero. This subroutine 300 is described in more detail in connection with FIG. 11.

At step 235, the microcomputer determines whether it has received m bits in a register, and if not, repeats the subroutine of step 232. Inasmuch as a string of leading zeroes is expected at the beginning of a card swipe, a predetermined number m zero values should be detected and discarded. It will be understood that the card will likely be experiencing acceleration (or deceleration) at this stage. The leading zeroes are discarded because there is a substantial likelihood that jitter at the beginning of the swipe will cause erroneous values. Thus, at step 238, the m zero values (ten in the preferred embodiment) are discarded.

When the program reaches step 239, it is appropriate to determine whether the card is being swiped fast or slow, so as to select a clock speed for use in establishing data cell timing intervals for the forthcoming bits to be decoded. Those skilled in the art will understand that a fast swipe generates shorter duration data cells than a slow swipe, and requires greater resolution of a counter used to accurately measure the duration of the data cell. Conversely, a slower swipe generates longer duration data cells, and a counter used to measure the data cell timing intervals for both slow and fast swipes can overflow, complicating the measurement of the data cell interval. Thus, at step 239, the microcomputer detects whether the swipe is fast or slow and selects an appropriate clock for use in determining data cell timing intervals. Step 239 is described in more detail in connection with FIG. 12.

At step 240, the DECODE VALUE subroutine 300 is reexecuted in order to begin to accumulate bit values in a register associated with the microcomputer 152 reserved for the purpose of forming a seven bit character.

Once the pattern of leading zeroes has been detected and discarded, the microcomputer begins to establish data cell timing intervals in an effort to look for sentinel characters, which necessarily will include several one's. At step 242, the microcomputer examines seven bits of data stored in the character forming register and determines whether a start sentinel character has been detected.

Once a start sentinel character is detected, the microcomputer proceeds to step 245 and stores the start sentinel as a seven bit character code.

At step 250, the microcomputer sets a character bit counter to an initial value, such as b=0, for purposes of marking the beginning and end of seven bit characters. It will be appreciated that synchronization to seven bits has occurred at this stage, since the purpose of the sentinel characters is to allow determination of the boundaries of characters, which now every seven bits.

At step 253, the DECODE VALUE subroutine 300 is reexecuted to shift the next bit value into the character forming register, the character bit counter b is incremented at step 255, and at step 257 the character bit counter b is tested to see if seven bits have been shifted into the character forming register. If not, steps 253, 255, 257 are repeated until seven bits have been accumulated.

When seven bits have been accumulated in the character forming register, at step 260 the microcomputer checks the putative character for valid parity. If the parity is invalid, the microcomputer moves to step 263, where it exits the interrupt service routine and indicates that the swipe failed. If parity is valid, the microcomputer proceeds to step 267 and stores the formed character in internal RAM.

Once the character is stored at step 267, the microcomputer proceeds to step 270 and determines whether the character was an end sentinel. If not, the microcomputer returns to step 250 and repeats the steps necessary to accumulate bits and form characters until an end sentinel is detected.

Once an end sentinel is detected, the microcomputer proceeds to step 273 and accumulates the next seven bits by repeating the DECODE VALUE subroutine 300 (in a fashion similar to steps 250-257), to form the longitudinal redundancy check (LRC) associated with all data read from the track. The LRC is stored at step 275. If the LRC is determined to be valid at step 277, the microcomputer proceeds to step 280, where it exits the interrupt service routine and indicates that the card swipe was successful. If the LRC is found to be invalid at step 277, the microcomputer moves to step 263, where it exits the interrupt service routine and indicates that the swipe failed.

Returning now to step 242, if a start sentinel is not detected, the program branches to step 285, wherein the microcomputer takes steps to determine whether the card may have been swiped backward, by checking for a reversed end sentinel. Normally, an end sentinel would be detected in a forward direction, at step 270. However, if the card is swiped backward through the terminal, the end sentinel will occur first. The preferred method is operative to decode F2F signals occurring from a reverse or backward swipe.

If at step 285 the F2F signals do not form a reversed end sentinel, the program returns to step 240 and repeats until a start sentinel or reversed end sentinel is detected. If the signal did form a reversed end sentinel character at step 285, the program proceeds to step 287 and stores the end sentinel and LRC, which precedes the end sentinel when a card is swiped backward and is already accumulated in a register when a reversed end sentinel is detected at step 285.

At step 290, the microcomputer accumulates seven bits of decoded values (by executing steps similar to steps 250-257) and shifts the next seven bits of data into the character forming register (most significant bit first, since the data is reversed) to form a data character. Once the data character is formed in this fashion, the character's parity is checked at step 295. If parity is determined to be invalid at step 295, the interrupt service routine is terminated at step 263 and an invalid swipe is indicated. If the parity is valid at step 295, the now-properly formed character is stored in memory at step 297, and the microcomputer tests to see whether it has now encountered a reversed start sentinel 298. If not, the program returns to step 290, accumulating seven bit signals and forming, checking and storing the next character.

Once the reversed start sentinel is detected at step 298, microcomputer determines whether the LRC is valid at step 299. If so, the interrupt service routine terminates at step 280 and indicates that the card swipe was successful. If not, the interrupt service routine terminates at step 263, indicating that the card swiped failed.

It will be understood at this juncture that because a card is manually swiped through the terminal, it experiences acceleration and deceleration that cause the data cell or bit cell timing boundaries to vary somewhat during the passage of the card past the read head. The present invention is operative to establish data cell timing boundaries by utilizing a data cell timing interval for a bit just decoded, as a nominal data cell timing interval for purposes of detecting transitions in the SELF CLOCKING SYNCHRONOUS signal that might correspond to a "1" or a "0". In other words, the data cell boundaries for a given decoded value, "1" or "0", are utilized to determine an expected data cell boundary for the next value.

Figure 10:
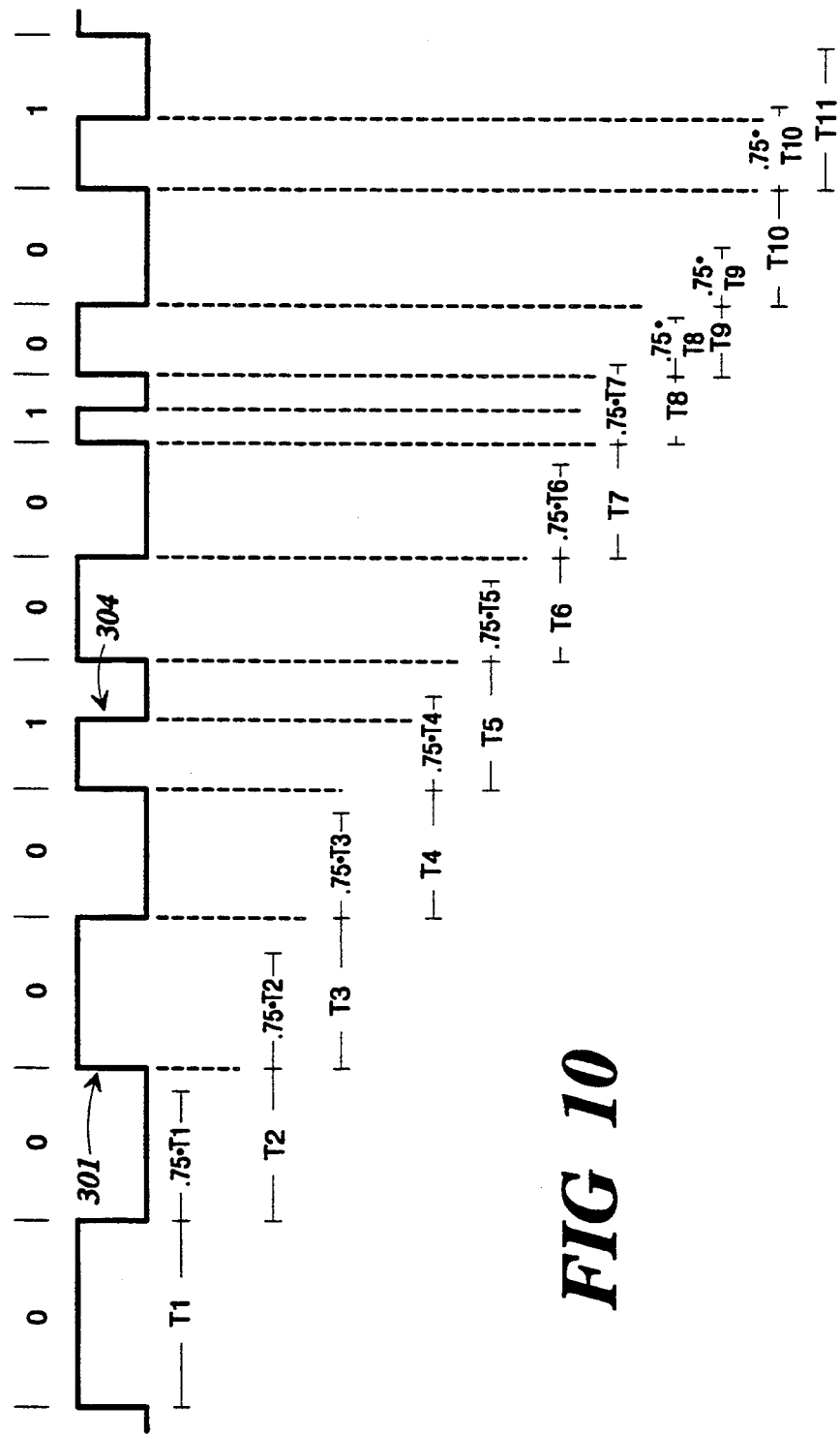
FIG. 10 is a timing diagram illustrating the determination of timing intervals utilized in the preferred method of decoding self clocking signals obtained from a swipe of a magnetic stripe card.

Turning in this regard to FIG. 10, it will be seen that a first data cell timing interval is T1, which happens to correspond to a zero. If the next value is a zero, it would be expected that a transition at 301 will occur after a timing interval T2 that is substantially the same as T1. On the other hand, if a first data cell timing interval is T4, which again happens to correspond to a zero, if the next value is a one, it would be expected that a transition at 304 will occur sometime during the approximate center of the timing interval T5.

Accordingly, in the present invention of real time data decoding, the microcomputer is operative to utilize a given data cell timing interval for a given logical value as a nominal or expected data cell timing interval for the next occurring logical value. The determination of whether a one or zero occurs is based upon whether the next transition in the SELF CLOCKING SYNCHRONOUS signal occurs within a predetermined percentage of the nominal or expected data cell timing interval, or whether such next transition occurs closer to the nominal or expected data cell timing interval. In the preferred embodiment, this predetermined percentage is seventy-five (75%) percent of the nominal or expected data cell timing interval.

Since the card may be accelerating or decelerating, the utilization of the immediately preceding data cell timing interval as the nominal or expected data cell timing interval for the next value, allows compensation for and adaptation to possible variations in the timing that occur because of card acceleration and deceleration.

FIG. 10 illustrates other examples of establishing nominal or expected data cell timing intervals T1 . . . T11 based on the usage of the predetermined 75% of the preceding data cell timing interval.

Figure 11:
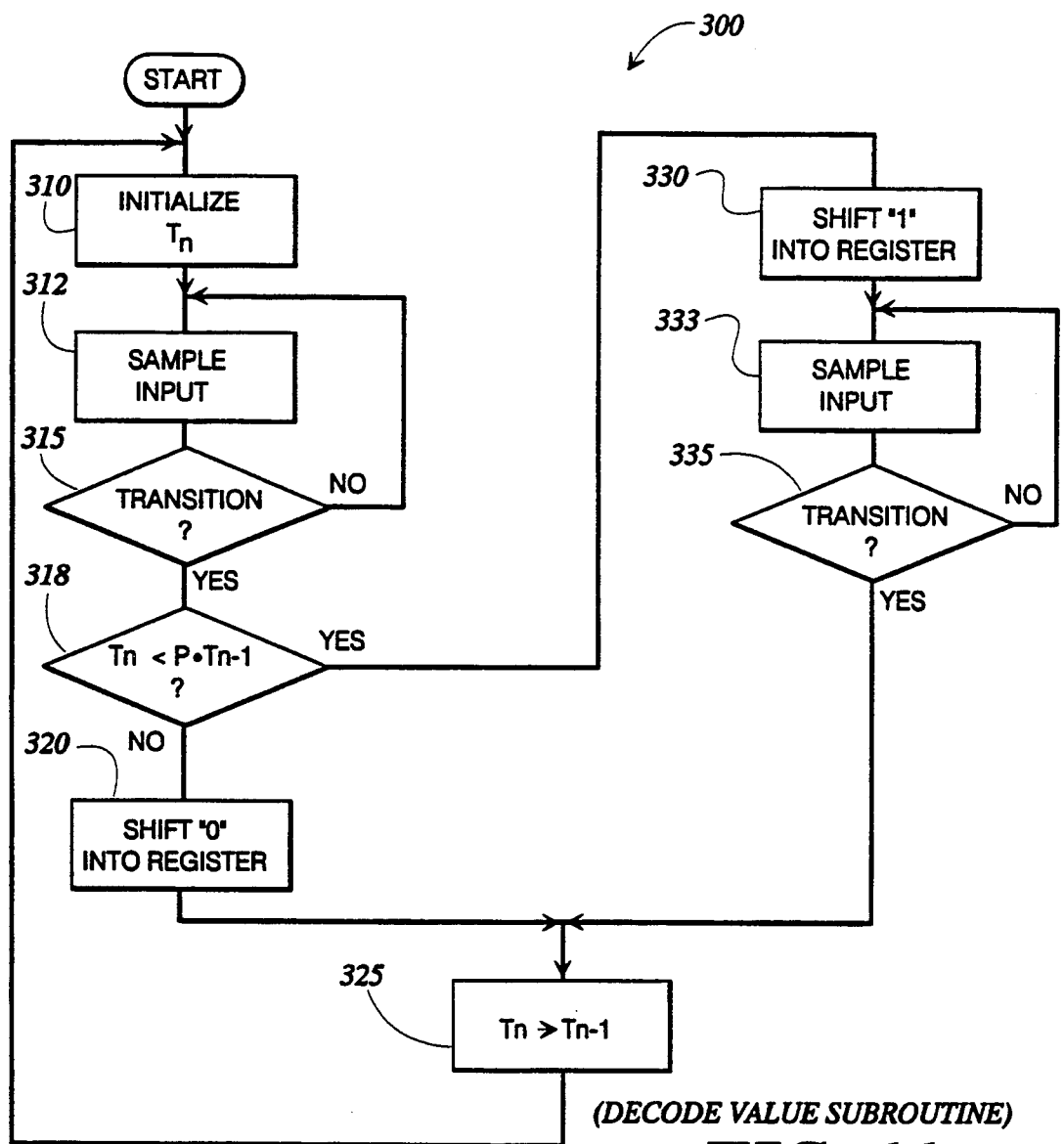
FIG. 11 is a flow diagram illustrating a bit decode value subroutine forming a part of the real time data decoding method of FIG. 9.

Turning next to FIG. 11, the DECODE VALUE subroutine 300 comprises steps for receiving the SELF CLOCKING SYNCHRONOUS or F2F signal and determining whether the signal represents a one or a zero under the two frequency coherent phase encoding scheme. This subroutine 300 begins at step 310 by initializing a timer $T_n$ that is used to determine data cell boundaries by measuring times between signal transitions. At step 312, the SELF CLOCKING SYNCHRONOUS signal input is sampled, and at 315, the inquiry is made whether a transition in the signal has occurred between the sampled value and a preceding value. If no transition has occurred, the program loops back to step 312.

When a transition is detected at step 315, the value of the timer $T_n$ is then compared to a predetermined percentage P of the immediately preceding data cell timer value $T_{n-1}$ at step 318. ($P \cdot T_{n-1}$).

If the transition occurred outside or subsequent to ($P \cdot T_{n-1}$), it is determined that the value is a zero. Thus, as step 320, a "0" is shifted into the microcomputer's character forming register.

The program branches to step 325, where preceding data cell boundary time $T_{n-1}$ is replaced with the current timer value $T_n$, since the present invention is operative to utilize the immediately preceding bit value's data cell boundary for purposes of detecting whether the next occurring transition corresponds to a zero or a one. In this manner, the present invention robustly adapts itself the varying data or bit cell boundary times that may result from acceleration or deceleration. The subroutine 300 then returns to step 310 to repeat the accumulation of decoded bit values.

Returning to step 318, if $T_n$ is less than the predetermined percentage P of $T_{n-1}$, it is indicated that a one has been detected. This transition has occurred in the approximate middle of the data cell boundary established by the immediately preceding bit value. Thus, at step 330, a "1" is shifted into the microcomputer's character forming register. Since a "1" has been detected, it is expected that another transition in the SELF CLOCKING SYNCHRONOUS signal will occur, to establish the end of the data cell boundary for the current bit value being decoded.

Thus, at step 333, the microcomputer samples the SELF CLOCKING SYNCHRONOUS signal and look for the final transition at 335. If no transition is detected, the program loops to step 333 until a transition is detected. When the transition occurs at 335, then the program branches to 325 where the preceding data cell boundary time $T_{n-1}$ is replaced with the current timer value $T_n$, since the present invention is operative to utilize the immediately preceding bit value's data cell boundary for purposes of detecting whether the next occurring transition corresponds to a zero or a one.

It will now be appreciated that the preferred embodiment carries out a method in the microcomputer 152 for reading a magnetic stripe on a card in a card transaction terminal, decoding encoded information stored on the card, and forming corresponding data characters in real time, in response to a swipe of the card through a card stripe read station in the transaction terminal. The method comprise the steps of:

(1) determining a first data cell timing interval between transitions in the SELF CLOCKING SYNCHRONOUS or F2F signal;

(2) determining a predetermined percentage of the first data cell timing interval as an expected or nominal first value timing interval;

(3) in response to the next transition of the SELF CLOCKING SYNCHRONOUS signal, determining whether the next transition occurred within the expected first value timing interval or whether the next transition occurred subsequent to the expected first value timing interval;

(4) establishing a decoded value as corresponding to a first value, "1" in the preferred embodiment for ANSI standard magnetic stripe cards, in response to the next transition occurring within the expected first value timing interval;

(5) establishing the decoded value as corresponding to a second value, "0" in the preferred embodiment for ANSI standard magnetic stripe cards, in response to the next transition occurring subsequent to the expected first value timing interval;

(6) storing the decoded value, "1" or "0", as appropriate, into a character forming register associated with the microcomputer;

(7) determining a second or subsequent data cell timing interval corresponding to transitions in the SELF CLOCKING SYNCHRONOUS signal corresponding to the decoded value, three in the case of a "1" and two in the case of a "0";

(8) determining a predetermined percentage of the second data cell timing interval as an expected second value timing interval;

(9) repeating the above steps for subsequent decoded values to accumulate a predetermined number of bits of decoded values in the register;

(10) forming a decoded character based on said predetermined number of bits of the decoded values; and

(11) providing the decoded character as an output.

In the foregoing manner, characters are decoded without interim data storage of the SELF CLOCKING SYNCHRONOUS clocking signals.

It should be understood that determining the second or subsequent data cell timing interval comprises establishing the end of the second data cell timing interval upon the occurrence of a third transition associated with the first value, wherein the first value is a "1" of a two-frequency coherent phase data format.

It will also be understood that determining the second data cell timing interval comprises establishing the end of the second data cell timing interval upon the occurrence of a second transition associated with the second value, wherein the second value is a "0" of a two-frequency coherent phase data format.

The preferred method further comprises detecting whether a decoded character is a predetermined sentinel character, and utilizing decoded characters subsequent to the sentinel character as data characters.

If the sentinel character is a start sentinel, the step of forming a decoded character in the register comprises forming the character by arranging the bits in the register in a predetermined direction. If on the other hand the sentinel character is an end sentinel, the step of forming a decoded character in the register comprises forming the character by arranging the bits in the register in a direction opposite to the predetermined direction.

The above-described method is repeated for all occurrences of the SELF CLOCKING SYNCHRONOUS signal generated during a single swipe of the card to form at least an account number associated with the card, and it will be understood that the account number is of course utilized to initiate a communication to a card transaction host.

Those skilled in the art will appreciate that the decode method illustrated by the steps shown in FIG. 9 does not require a large memory buffer in order to perform the various post-processing algorithms common to prior art terminals. Since track 1 data contains a maximum of 79 characters, all of the data may be stored easily in the 128 bytes of internal RAM found in the preferred microcomputer 152. In contrast, prior art methods that perform a post-processing type of decode algorithm must provide enough memory to store one byte of data associated with each transition in the F2F signal. Since track 1 specifies 210 bits per inch, and is 3.25 inches long, the prior art terminals must provide enough memory to store 1366 bytes (in the event all of the data were ones). This requires a 2-kilobyte external RAM.

It will now be appreciated that the steps shown in FIG. 9 comprise a method for reading a magnetic stripe on a data card in a card transaction terminal, decoding information stored on the card, and forming corresponding data characters in real time, in response to a swipe of the card through a card stripe read station in the transaction terminal. The preferred method comprises steps of providing a memory large enough to store data characters corresponding to the totality of SELF CLOCKING SYNCHRONOUS signals generated during a swipe of the card, but not large enough to store all of the SELF CLOCKING SYNCHRONOUS signals, to eliminate the need for separate random access memory. The method further involves detecting a sentinel by decoding the SELF CLOCKING SYNCHRONOUS signals, and forming a data character in response to a predetermined number of SELF CLOCKING SYNCHRONOUS signals generated subsequent to the sentinel. Once formed, the data character is stored in the limited character memory. These steps are repeated for all SELF CLOCKING SYNCHRONOUS signals generated during a single swipe of a card, to form all data characters stored on the card and storing same in the character memory. The method is also operative in reverse, by detecting an end sentinel in the event that a card has been swiped in reverse, in which case the order of the bits forming the characters is reversed so as to form the appropriate data character.

Figure 12:
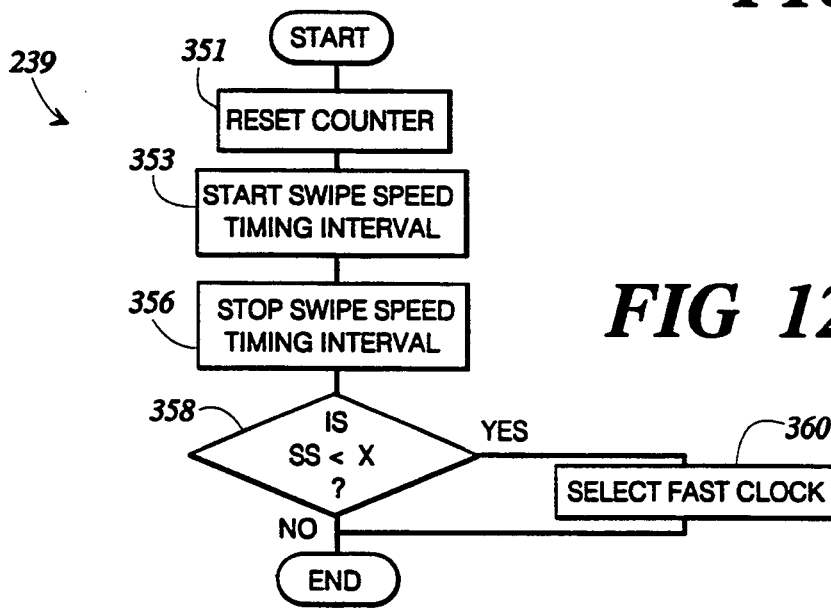
FIG. 12 is a flow diagram illustrating a method for adapting to a fast or slow swipe forming a part of the real time data decoding method of FIG. 9.

FIG. 12 illustrates the step 239 for detecting a fast or slow swipe and selecting an appropriate clock for use in determining data cell timing intervals. Prior to discussing FIG. 12 in detail, it will be recalled that one of the advantages of the present invention is that decoding of data from a swipe of the card is effected "on the fly", or in real time, thereby obviating external RAM for the device. Prior art methods for determining data cell intervals typically calculate the average data cell interval over a number of prior data cell intervals subsequent to the swipe, to establish an expected data cell interval. Such prior art methods are not real time, require storage of sufficient data in RAM for calculating the average, and are computationally expensive.

It will also be recalled that the present invention utilizes the immediately preceding data cell interval for purposes of decoding ones and zeroes in the two frequency coherent phase encoded data format. Measurement of the data cell intervals in the preferred embodiment is effected by using timer/counter circuits internal to the preferred low cost 80C51 type microcomputer 152, which are utilized as eight-bit counters.

It has been discovered by the present inventors that real time data decoding presents certain difficulties in determining the data cell timing intervals over a wide range of card swipe speeds. It is believed that these difficulties have discouraged others from attempting to implement real time data decoding, but to elect to use more expensive methods that require more capable microcomputers and external RAM for data storage.

In order to be acceptable in the marketplace, a card swipe terminal should be able to handle card swipe speeds varying from about 6-8 inches per second to about 45-50 inches per second. Swipe speeds in the slower end of the range have been found to cause the internal timer/counter circuits used to measure the data cell timing intervals to overflow their eight-bit maximum (256) at the nominal clock rate for the microcomputer (about 1 MHz), suggesting that a slower clock speed for the timer/counter should be used. However, faster swipe speeds using a slower clock (e.g., 256 kHz) only allow a small number of counts of the timer/counter (for example, 4-5) to accumulate over an entire data cell timing interval, resulting in a coarse resolution of the data cell timing interval and increasing the rate of errors in differentiating a "1" from a "0".

The present invention therefore includes structure and carries out steps for adapting to varying swipe speeds, namely, the provision of a selectable clock rate for the timer/counter used for measuring the data cell timing interval. In particular, it will be recalled from the above discussion of FIG. 6 that the SLOW CLOCK signal is provided to the P3.5 input of the microcomputer 152. The timer/counter 1 of the microcomputer is selectably clocked at the nominal rate for the microcomputer (about 1 MHz) for fast swipes, or at the rate of the SLOW CLOCK signal (about 220 kHz) for slow swipes.

Referring now in particular to FIG. 12, the step 239 comprises a number of substeps for detecting whether a card swipe is fast or slow and for selecting an appropriate clock speed for the internal timer/counter of the microcomputer 152. First, step 239 is entered in a default state wherein the SLOW CLOCK signal will be utilized for advancing the timer/counter 1 which is employed in the preferred embodiment for measuring the data cell timing interval of a zero value. At step 351, this timer/counter 1 is reset to zero (or cleared), to prepare for detection of a fast or slow swipe.

At step 353, the timer/counter starts a swipe speed timing interval at the next detected transition of the SELF CLOCKING SYNCHRONOUS signal. The timer/counter then increments at a predetermined rate determined by the SLOW CLOCK signal. At the next transition of the SELF CLOCKING SYNCHRONOUS signal (it will be recalled that the swipe is still in the leading zeroes portion), the timer/counter is stopped (step 356), giving a "swipe speed" measure SS of the data cell timing interval for a zero value.

At step 358, the value of the timer/counter containing the measured zero value data cell timing interval SS is compared to a predetermined nominal value X, where X represents a threshold data cell timing interval for selection of a faster clock. In the preferred embodiment, with a nominal 210 bits per inch data density on ANSI standard magnetic cards, for a swipe speed of 20 inches per second as the speed above which the present invention will select a faster clock, the duration of X (the data cell timing interval that causes selection of the faster clock) is about 238 microseconds.

If the measured zero value data cell timing interval is less than about 238 microseconds, the faster clock will be selected by branching to step 360. The faster clock is selected by setting an appropriate control bit associated with the timer/counter 1, causing timer/counter 1 to advance at the microcomputer 152 internal clock rate of about 1.2 MHz.

If on the other hand the measured zero value data cell timing interval is greater than about 238 microseconds, the default mode using the SLOW CLOCK signal for advancing the timer/counter 1 is unchanged.

It will now be appreciated that the timer/counter 1 will be utilized at the selected clock rate for measurement of subsequently occurring data cell intervals and decoding of data values.

The present invention has been described in relation to particular embodiments which are intended in all respects to be illustrated rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A circuit for a low cost, easily manufacturable card transaction terminal for reading a magnetic stripe on a data card, said circuit being mountable in a card terminal housing, comprising:

- a single double-sided printed circuit board having a first side and a second side and a plurality of mounting holes;
- an alphanumeric liquid crystal display (LCD) device affixed to said first side;
- a single chip liquid crystal display driver circuit responsive to control signals for causing said LCD to display alphanumeric information;
- bracket means having a plurality of twistable fasteners for extending through some of said mounting holes in said circuit board and for holding said liquid crystal display to said first side;
- a plurality of keypad electrical contacts formed on said first side, said keypad contacts being positioned to make an electrical circuit when contacted by a bridging conductive pellet on a keypad membrane associated with said card terminal housing; and
- a plurality of circuit components all affixed to said second side, said circuit components consisting essentially of:
    - a nonvolatile electrically erasable programmable read-only memory (EEPROM) circuit for storing predetermined operational parameters for said circuit;
    - a single chip modem circuit;
    - data access arrangement circuitry for connecting said modem circuit to an external telephone line;
    - a magnetic stripe read head interface circuit connected to an external magnetic stripe read head, said circuit comprising a single integrated circuit containing a plurality of operational amplifiers and a plurality of external components for setting of parameters for said operational amplifiers, said interface circuit providing self clocking signals corresponding magnetic signals read from a magnetic stripe card swiped against the external read head;
    - a single chip microcomputer circuit including an internal mask-programmed read only memory for storage of a software program for said microcomputer circuit, said microcomputer circuit being operative for receiving operator input command signals from said keypad electrical contacts, for converting said self clocking signal into data corresponding to information encoded on the magnetic card without interim storage of said self clocking signals, for controlling communications with a host system via said modem circuit, and for providing said control signals to said liquid crystal display driver circuit; and
    - said circuit components including no memory components other than said EEPROM and memory internal to said single chip microcomputer.

* * * * *